(12) United States Patent
Sasahara et al.

(10) Patent No.: US 8,581,570 B2
(45) Date of Patent: Nov. 12, 2013

(54) FREQUENCY ERROR DETECTION APPARATUS

(75) Inventors: Shoichi Sasahara, Tokyo (JP);
Tatsuhisa Furukawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 246 days.

(21) Appl. No.: 13/233,229

(22) Filed: Sep. 15, 2011

(65) Prior Publication Data

US 2012/0242324 A1 Sep. 27, 2012

(30) Foreign Application Priority Data

Mar. 25, 2011 (JP) .................................. 2011-068479

(51) Int. Cl.
*G01R 23/02* (2006.01)
(52) U.S. Cl.
USPC ........................................ 324/76.19; 375/340
(58) Field of Classification Search
None
See application file for complete search history.

(56) References Cited

U.S. PATENT DOCUMENTS

| | | | |
|---|---|---|---|
| 6,487,252 B1 * | 11/2002 | Kleider et al. ................. | 375/260 |
| 2010/0207670 A1 | 8/2010 | Matsuoka et al. | |
| 2010/0226467 A1 | 9/2010 | Furukawa et al. | |
| 2011/0033012 A1 | 2/2011 | Matsuoka et al. | |
| 2011/0051863 A1 | 3/2011 | Furukawa et al. | |
| 2011/0206168 A1 | 8/2011 | Matsuoka et al. | |

FOREIGN PATENT DOCUMENTS

| | | |
|---|---|---|
| JP | 3238120 B2 * | 12/2001 |
| JP | 2003-304217 | 10/2003 |

OTHER PUBLICATIONS

Machine English translation of Japanese Patent to Inventors Hayashi Kenichiro et. al. JP 3238120 B2, Dec. 10, 2001. Translation of pp. 1-18 created on Jul. 8, 2013.*

* cited by examiner

*Primary Examiner* — Melissa Koval
*Assistant Examiner* — Stephen G Armstrong
(74) *Attorney, Agent, or Firm* — White & Case LLP (57) ABSTRACT

Embodiments are provided: a known signal extraction circuit a distributing arrangement circuit which distributes a known signal in a fixed section; a frequency conversion circuit which causes the distributed output to be a frequency-domain signal; a delay detection circuit which determines an amount of phase variation between adjacent frequency components in the frequency-domain signal; a distributing arrangement circuit which distributes a signal of the same sequence as the known signal described above in a fixed section; a frequency conversion circuit which causes the distributed output to be a frequency-domain signal; a delay detection circuit which determines an amount of phase variation between adjacent frequency components in the frequency-domain signal; a correlation operation circuit which obtains a correlation value between two delay detection outputs; and a peak detection circuit which detects one or more high power peaks among the correlation values and obtain frequency difference from a reference value.

7 Claims, 8 Drawing Sheets

FREQUENCY ERROR DETECTION APPARATUS

CROSS-REFERENCE TO RELATED APPLICATION

This application is based upon and claims the benefit of priority from Japanese Patent Application No. 2011-068479 filed in Japan on Mar. 25, 2011; the entire contents of which are incorporated herein by reference.

FIELD

Embodiments to be described herein relate generally to a frequency error detection apparatus in a receiver for wireless communication.

BACKGROUND

In the broadcast and communication field, data is transmitted in blocks with a predetermined length such as frames. A receiver detects an identifier of a frame synchronization signal or the like stored in transmitted data for each frame and performs demodulation processing for each frame by the frame synchronization signal or the like.

For example, in DTMB (Digital Terrestrial Multimedia Broadcast), which is a digital terrestrial broadcast standard of China (People's Republic of China), a frame is configured by a frame body (hereinafter referred to as an FB) and a frame header (hereinafter referred to as an FH). In an FB, 3780 symbols are stored which are combination of modulated source stream data and system information. In the FH, a quasi-random noise sequence (hereinafter referred to as a PN sequence) is stored as a known signal for identifying the frame. The DTMB has three kinds of FH length and has first to third broadcast modes corresponding to the three FH lengths.

There is a technique of inputting a received signal converted to a frequency-domain signal, as a received signal of a receiver, and detecting a frequency error by determining correlation between this received signal converted to the frequency-domain signal and a known signal inserted into the frequency-domain signal and determining an amount of change from a reference value.

On the other hand, there is a technique of inputting a received signal converted to a time-domain signal, as a received signal of a receiver, frequency-converting the received signal converted to the time-domain signal as well as frequency-converting a known signal inserted in the time-domain region, estimating influence of distortion of the frequency-converted known signal caused in a transmission line, and correcting periodic distortion (a frequency error) of the received signal on the basis of the estimated value.

However, in the case of detecting frequency distortion (an error) by causing a time-domain received signal to be a frequency-domain signal by frequency conversion in the DTMB, as described before, a frequency conversion circuit corresponding to the length of a time-domain known signal is required. In the DTMB, three kinds of frame header (FH) (symbol lengths: 420, 595 and 945) are prepared as the FH of a time-domain received signal. In the case of frequency-converting an FH to use it, at least four kinds of frequency conversion circuit, including three frequency conversion circuits corresponding to the three kinds of FH signals and one frequency conversion circuit for frequency-converting a frame body (FB) with a symbol length of 3780, and there is a problem that the circuit scale is increased.

A problem to be solved by the present invention is to provide such a frequency error detection apparatus that a frequency conversion circuit can be small-sized, and thereby, the circuit scale can be reduced, in the case of detecting frequency distortion (an error) by causing a time-domain received signal to be a frequency-domain signal by frequency conversion.

DETAILED DESCRIPTION

A frequency error detection apparatus according to embodiments of the present invention is provided with: a known signal extraction circuit, a first distributing arrangement circuit, a first frequency conversion circuit, a first delay detection circuit, a sequence generation circuit, a second distributing arrangement circuit, a second frequency conversion circuit, a second delay detection circuit, a correlation operation circuit and a peak detection circuit.

The known signal extraction circuit extracts, from a received signal in which a known signal changing periodically is inserted, the known signal.

The first distributing arrangement circuit distributingly arranges the known signal extracted by the known signal extraction circuit, in a fixed section.

The first frequency conversion circuit frequency-converts an output of the first distributing arrangement circuit to a frequency-domain signal.

The first delay detection circuit calculates an amount of phase variation between adjacent frequency components by delay-detecting the frequency-domain signal which is the output of the first frequency conversion circuit.

The sequence generation circuit generates the same sequence as the known signal changing periodically.

The second distributing arrangement circuit distributingly arranges the sequence generated by the sequence generation circuit, in a fixed section.

The second frequency conversion circuit frequency-converts an output of the second distributing arrangement circuit to a frequency-domain signal.

The second delay detection circuit calculates an amount of phase variation between adjacent frequency components by delay-detecting the frequency-domain signal which is the output of the second frequency conversion circuit.

The correlation operation circuit outputs a correlation value between an output of the first delay detection circuit and an output of the second delay detection circuit.

The peak detection circuit detects one or more high power peaks among the correlation values, calculates difference from a reference value and outputs the difference as a frequency error.

Embodiments of the present invention will be described below with reference to drawings.

In the embodiments of the present invention, description will be made on a frequency error detection apparatus for extracting a time-domain known signal included in a received signal, frequency-converting the time-domain known signal, performing correlation operation between the frequency-converted known signal and a frequency-converted known reference signal, and detecting a frequency error of the received signal on the basis of deviation of a correlation value from a reference value. The description will be made, with the DTMB as an example.

[First Embodiment]

Figure 1:
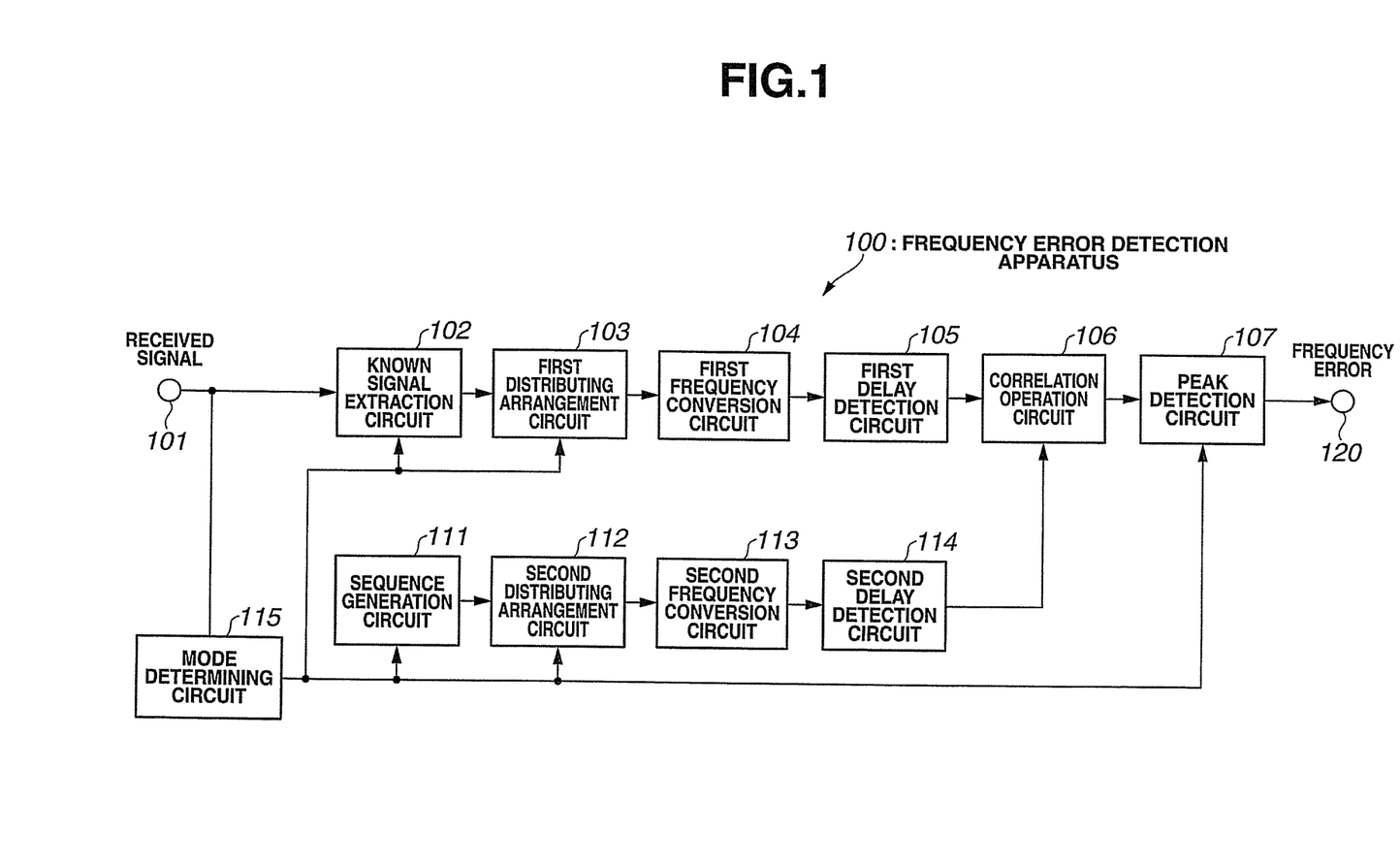
FIG. 1 is a block diagram of a frequency error detection apparatus of a first embodiment of the present invention.

FIG. 1 shows a block diagram of a frequency error detection apparatus of a first embodiment of the present invention. In this embodiment, a frequency error detection apparatus used in a DTMB receiver will be described.

A frequency error detection apparatus 100 of the first embodiment shown in FIG. 1 is provided with a received signal input terminal 101, a known signal extraction circuit 102, a first distributing arrangement circuit 103, a first frequency conversion circuit 104, a first delay detection circuit 105, a sequence generation circuit 111, a second distributing arrangement circuit 112, a second frequency conversion circuit 113, a second delay detection circuit 114, a correlation operation circuit 106, a peak detection circuit 107, a frequency error signal output terminal 120 and a mode determining circuit 115.

The known signal extraction circuit 102 extracts, from a received signal in which a periodically changing known signal is inserted, the known signal.

The first distributing arrangement circuit 103 distributingly arranges the known signal extracted by the known signal extraction circuit 102 in a fixed section.

The first frequency conversion circuit 104 frequency-converts an output of the first distributing arrangement circuit 103 to a frequency-domain signal.

The first delay detection circuit 105 calculates an amount of phase variation between adjacent frequency components by delay-detecting the frequency-domain signal which is the output of the first frequency conversion circuit 104.

The sequence generation circuit 111 generates the same sequence as the periodically changing known signal described before.

The second distributing arrangement circuit 112 distributingly arranges the sequence generated by the sequence generation circuit 111, in the fixed section.

The second frequency conversion circuit 113 frequency-converts an output of the second distributing arrangement circuit 112 to a frequency-domain signal.

The second delay detection circuit 114 calculates an amount of phase variation between adjacent frequency components by delay-detecting the frequency-domain signal which is the output of the second frequency conversion circuit 113.

The correlation operation circuit 106 outputs a correlation value between an output of the first delay detection circuit 105 and an output of the second delay detection circuit 114.

The peak detection circuit 107 detects one or more high power peaks among the correlation values from the correlation operation circuit 106, calculates difference from a reference value, and outputs the difference as a frequency error.

Figure 2A:
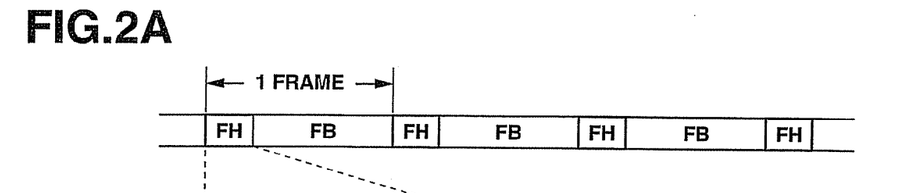
FIGS. 2A and 2B are diagrams showing a DTMB frame configuration and a frame header configuration.
Figure 2B:
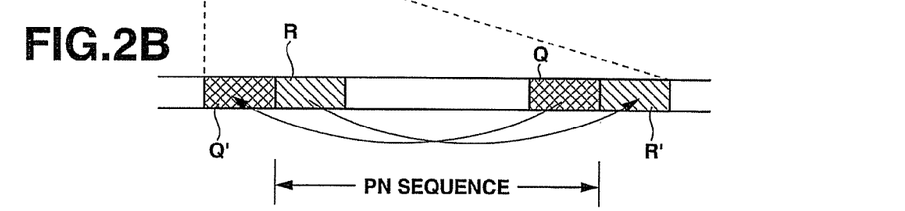

FIGS. 2A and 2B show a frame configuration of a received signal in the DTMB and a configuration of a frame head (FH) of the frame. FIG. 2A shows a frame configuration of a received signal, and FIG. 2B shows an enlarged configuration of the frame header of the header in FIG. 2A. As a broadcast signal, multiple frames are continuously transmitted as shown in FIG. 2A.

The received signal is a signal with a frame configuration in which a known signal is periodically inserted. A DTMB frame is configured by a frame header (FH) and a frame body (FB), and a known signal (PN sequence) for identifying the frame is inserted in the FH. Furthermore, the FH is characterized in that a part of a first half of the sequence Q and a part of a second half R of the sequence are configured by cyclic extension of the PN sequence. Not only Q and Q' are the same but also R and R' are the same.

In the DTMB, there are first, second and third broadcast modes corresponding to three kinds of symbol lengths 420, 595 and 945 of the frame header (FH) of a time-domain received signal. Known signals (PN sequences) inserted in three FHs with the different lengths in the first, second and third broadcast modes have symbol lengths, 255, 595 and 511, respectively. In the second broadcast mode among the three modes, the FH and the PN sequence included therein have the same length (that is, the symbol length of 595). In the first and third broadcast modes except the second mode, among these first, second and third broadcast modes, the PN sequence inserted in the FH positionally varies within the FH in accordance with a certain rule, for each of a predetermined number of continuously received frames (this is called FH variation).

In the description below, the first broadcast mode (with the FH length of 420) among the three broadcast modes will be described as a concrete example.

Figure 3:
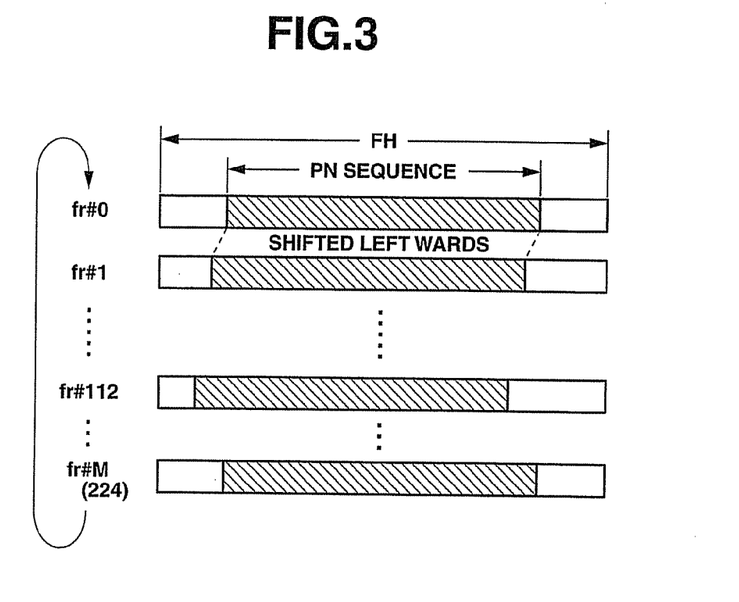
FIG. 3 is a diagram showing variation of a frame header.

FIG. 3 shows a state of shift of a PN sequence in FH variation. In the FH variation, the PN sequence shown in FIG. 2B shifts right or left by an amount of change specific to each frame as in FIG. 3. The amount of change decreases after a certain frame number (expressed as fr #), and the amount of change returns to 0 in a frame period. A frame can be identified by this variation pattern. In general, when the frame number fr # is assumed to be 0 to M, a maximum frame number M differs for each of the three broadcast modes. In the first broadcast mode (with the FH length of 420), M=224.

As for the first broadcast mode (with the FH length of 420), a period formed by 225 frames with the frame numbers fr #0 to 224 is called a super frame. In the example of FIG. 3, the PN sequence gradually shifts from a position at fr #0, deviates from the reference most at fr #112, and returns to the initial position at the first frame number fr #0. The contents of fr #224 and fr #0 are the same. Therefore, the two frames of fr #224 and fr #0 are transmitted with the same PN sequence.

Here, the mode determining circuit 115 will be described.

In the configuration of this embodiment, the mode determining circuit 115 configured to determine one mode among the three broadcast modes of the first to third broadcast modes is provided. The mode determining circuit 115 controls the known signal extraction circuit 102, the first distributing arrangement circuit 103, the sequence generation circuit 111, the second distributing arrangement circuit 112 and the peak detection circuit 107 according to a distinguished broadcast mode to perform frequency error detection of a received signal according to the received broadcast mode appropriately. For example, at the time of performing distributing arrangement, it is possible to determine a broadcast mode first and then detect a frequency error because broadcast mode information is required. Detection of a frequency error and determining a broadcast mode cannot be performed at the same time.

As a determination method of the mode determining circuit 115, there is, for example, a method in which correlations between a known signal of a received signal and a reference signal (three kinds) are obtained, and a mode with the highest correlation value is determined to be a broadcast mode.

Thus, in the frequency error detection apparatus used for a receiver capable of receiving broadcast signals of the three broadcast modes, it is possible to automatically determine the broadcast mode of a broadcast signal and perform frequency error detection corresponding to the determined broadcast mode by the mode determining circuit.

Next, an operation of the frequency error detection apparatus of FIG. 1 will be described.

In FIG. 1, a received signal is inputted to the known signal extraction circuit 102, and a received PN sequence is extracted. The extracted PN sequence is inputted to the first distributing arrangement circuit 103.

Figure 4A:
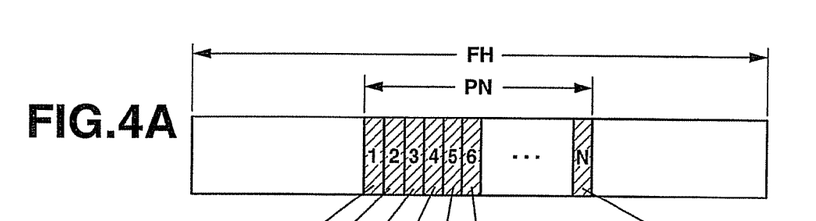
FIGS. 4A and 4B are diagrams illustrating processing of a distributing arrangement circuit.
Figure 4B:
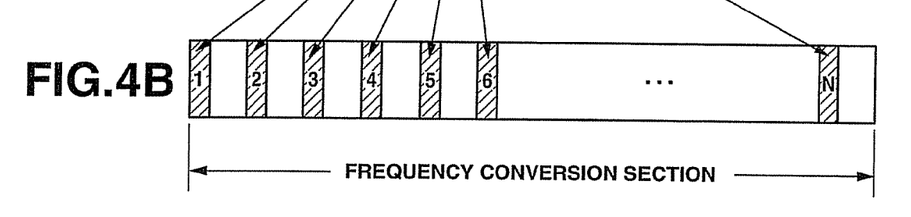

The first distributing arrangement circuit 103 outputs the received PN sequence shown in FIG. 4A by distributingly arranging the PN sequence in a frequency conversion section (a section longer than the PN sequence length) shown in FIG. 4B. Here, the frequency conversion section is a fixed section longer than the PN sequence length. In this embodiment, the frequency conversion section is the same as a frequency conversion section of a frequency conversion circuit (not shown) used at the time of frequency-converting a frame body (FB) with a symbol length of 3780. FIGS. 4A and 4B show an example in which a received PN sequence is divided into N (N is, for example, the same as the number of symbols of the PN sequence) and distributingly arranged in a frequency conversion section in a frequency-conversion circuit for FB not shown. The PN sequence configured by N symbols, which is shown in FIG. 4A, is equally distributed in the frequency conversion section in symbols, as shown in FIG. 4B. In the first broadcast mode, N is 255. The frequency conversion section is fixed, for example, to 3780, the number of symbols of the conversion section of a frequency converter for FB, for all the broadcast modes. Therefore, the interval between the divided PN sequences which are distributingly arranged in the frequency conversion section differs for each broadcast mode.

As for a method for interpolation among symbols distributed at the time of distributingly arranging a received PN sequences of N symbols in a frequency conversion section in symbols, a method of embedding the intervals with a fixed value, a method of embedding the intervals with random sequence values, a method of copying data of a known signal extracted by the known signal extraction circuit and the like can be used.

As described above, by performing distributing arrangement, it is possible to suppress an unnecessary high-frequency component due to a breakpoint (see FIG. 7B to be described later) even in the case of performing frequency conversion with a frequency conversion section longer than a PN sequence length (for example, the frequency conversion section in the frequency conversion circuit for FB (not shown)).

The first frequency conversion circuit 104 converts the received PN sequence which has been distributingly arranged, from a time-domain signal to a frequency-domain signal and outputs the frequency-domain signal, by an algorithm such as FFT and DFT.

The first delay detection circuit 105 calculates and outputs phase difference between adjacent carriers of the received PN sequence which has been converted to the frequency-domain signal after being distributingly arranged. The phase difference between adjacent carriers outputted from the first delay detection circuit 105 itself is outputted as being different from a reference phase difference if the received PN sequence has a frequency error relative to a reference signal (PN sequence).

On the other hand, the sequence generation circuit 111 generates and outputs the same PN sequence as the PN sequence of a received FH as a reference signal. The second distributing arrangement circuit 112 outputs the reference signal by distributingly arranging the reference signal in the frequency conversion section in a method similar to the case of the known signal of the received signal. The second frequency conversion circuit 113 converts the reference signal which has been distributingly arranged, from a time-domain signal to a frequency-domain signal and outputs the frequency-domain signal, by an algorithm such as FFT and DFT. The second delay detection circuit 114 calculates and outputs phase difference between adjacent carriers of the reference signal which has been converted to the frequency-domain signal after being distributingly arranged. As for this phase difference between adjacent carriers of the reference signal, it is possible to calculate a phase difference in advance and use it.

The correlation operation circuit 106 calculates and outputs a correlation value between the phase difference of the received PN sequence and the phase difference of the reference signal.

Figure 5:
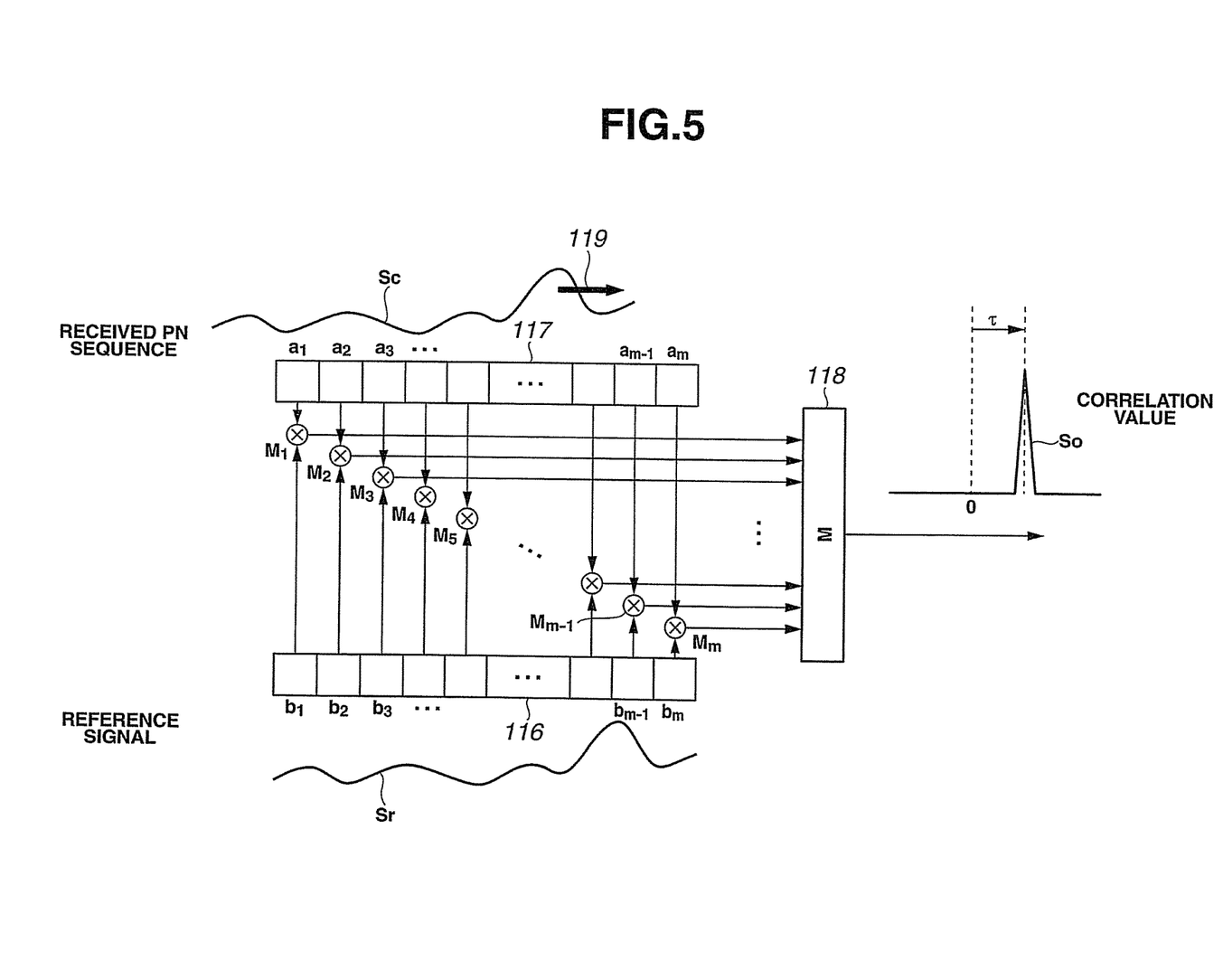
FIG. 5 is a diagram illustrating processing of a correlation operation circuit.

FIG. 5 shows the configuration and processing of the correlation operation circuit.

The correlation operation circuit 106 is provided with a sequence holding section 116 configured to hold multiple sample values of a reference signal Sr, a sequence holding section 117 configured to hold a received PN sequence Sc while shifting the received PN sequence Sc sample by sample, m multipliers M1 to Mm configured to multiply corresponding sample values together, between sample values of m register sections a1 to am constituting the sequence holding section 116 and sample values of m register sections b1 to bm constituting the sequence holding section 117, and an adder 118 configured to add m multiplication results of the multipliers M1 to Mm and outputs an addition result as a correlation value. All of a delay detection output on the received PN sequence side, a delay detection output on the reference signal side and the correlation value are obtained as frequency-domain values. The data Sc and Sr shown in FIG. 5 show waveforms after frequency conversion. After converting each of the received PN sequence and the reference signal to a frequency-domain signal, delay detection is further performed. Then correlation operation is performed in the frequency domain.

In this configuration, the correlation value is obtained by the correlation operation circuit 106 performing product sum operation of multiplication and addition with the reference signal Sr while shifting the received PN sequence Sc sample by sample. An arrow 119 shows a shift direction.

The peak detection circuit 107 detects one or more high power peaks from correlation values and calculates a frequency error from difference τ from a reference peak position 0. At the peak position 0, a peak appears when the received PN sequence and the reference signal correspond to each other without a frequency error. When there is a frequency error between the received PN sequence and the reference signal, Sc is shifted by a certain fixed amount (a maximum amount of shift) sample by sample from the state in which Sc is deviated relative to Sr as shown in FIG. 5. A maximum detectable frequency error changes according to the maximum amount of shift. The amount of shift τ required until the peak becomes the maximum by performing shifting sample by sample is measured. By calculating the reciprocal of the measured amount of shift τ, a frequency error can be calculated.

Here, an amount of frequency error at the time of shifting the received PN sequence Sc by one sample differs for each broadcast mode.

Next, description will be further made mainly on merits obtained by distributing arrangement in the configurations of FIGS. 1 to 5 with reference to FIGS. 6 to 10.

Figure 6:
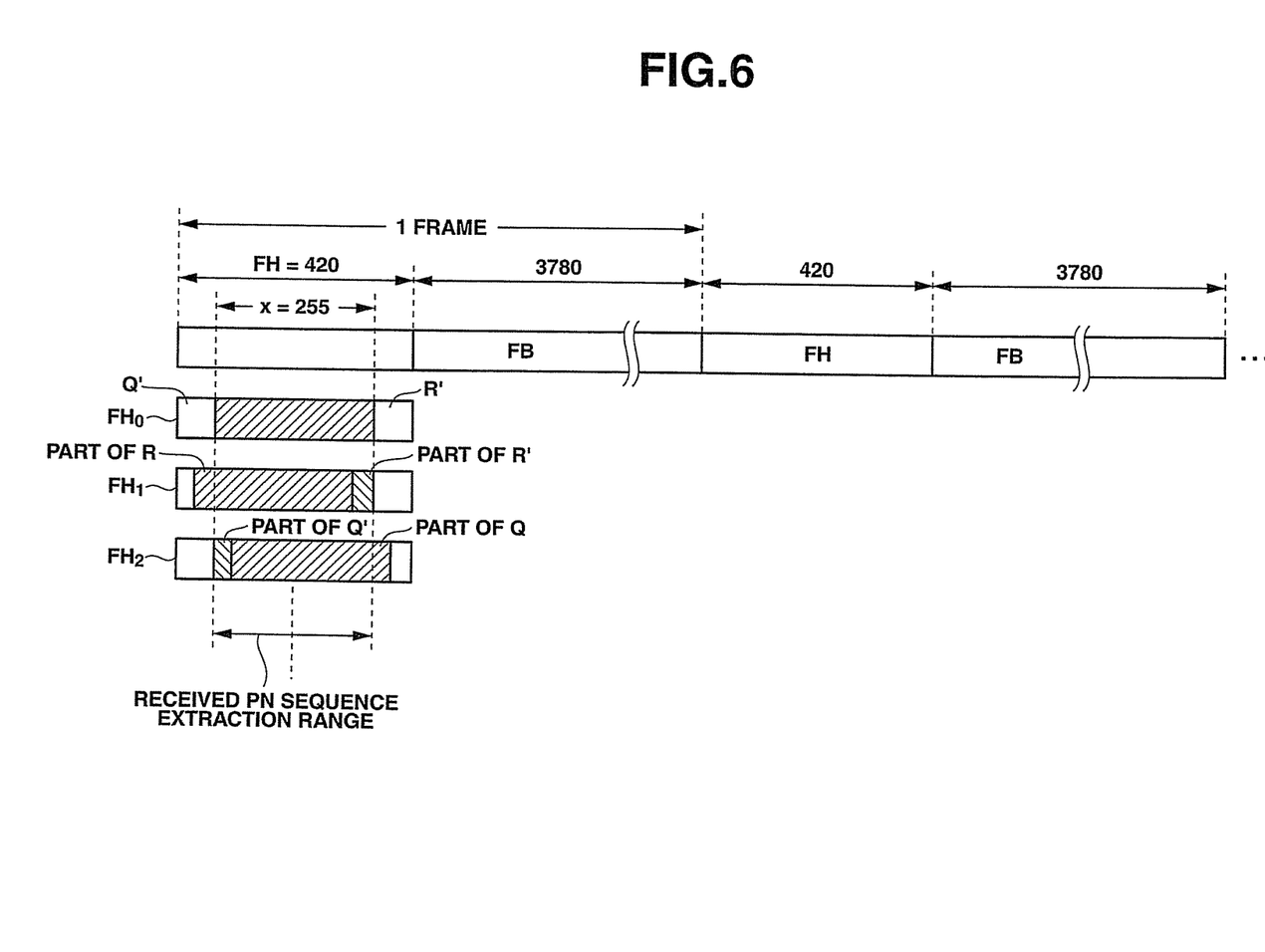
FIG. 6 is a diagram illustrating a frame configuration in a first broadcast mode of DTMB, FH variation, and extraction processing of a known signal (received PN sequence) at the time of the FH variation.

FIG. 6 illustrates a frame configuration in the first broadcast mode (FH length=420 symbols; PN sequence length x=255 symbols) of the DTMB, FH variation, and extraction processing of a known signal (a received PN sequence) at the time of the FH variation. The length of a frame body FB is 3780 symbols, which is common to the first to third broadcast modes.

As shown in FIG. 2B, an FH has a cyclically extended configuration. Therefore, even if a received PN sequence varies within a range of the FH as shown in FIG. 3, it is possible to extract the PN sequence if an extraction range of the received PN sequence is set at the center of the FH length as shown in FIG. 6. That is, if the extraction range of the PN sequence is set at the center of the FH length as shown in FIG. 6, and the PN sequence of the first frame (denoted by reference numeral FH0) is arranged at the center of the FH length, sequence parts cyclically extended on both of the right and left sides of the PN sequence shift at the same time as shown in FIG. 2B even if the PN sequence shifts left as denoted by reference numeral FH1 or right as denoted by reference numeral FH2 from the position. Therefore, as far as the PN sequence and its cyclically extended sequence parts exist within the extraction range described above, it is possible to certainly extract a sequence equivalent to the PN sequence.

Figure 7A:
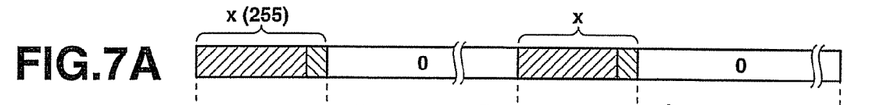
FIGS. 7A to 7D are diagrams illustrating merits of distributing arrangement of a received PN sequence.
Figure 7B:
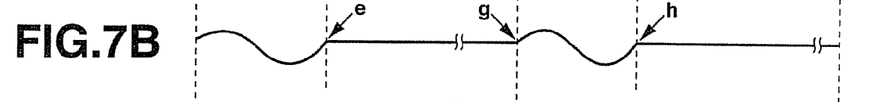

FIG. 7A shows a sequence before frequency conversion when seen after the frequency conversion, in the case where, without distributingly arranging an extracted received PN sequence x, symbol data of this received PN sequence x is assigned to a frequency conversion section (with a symbol length of 3780) of the frequency conversion circuit for FB from the top thereof. In this case, the received PN sequence x has a length of 255 as shown in FIG. 7A, and the period of 3780−255 (=3525) is a period without data. Therefore, interpolation is performed with a fixed value 0 for the period. As described above, if the received PN sequence is not distributingly arranged, a breakpoint occurs between a period with data and a period without data (the period of the fixed value 0). In FIG. 7B, the periods with data are indicated with the use of sine waves so that breakpoints can be easily understood visually. Actually, the waveform of FIG. 7B is a PN sequence and, therefore, a binary waveform showing 0 or 1. The waveform of FIG. 7B corresponds to a waveform before frequency conversion when seen after the frequency conversion, and breakpoints e, g and h exist.

Figure 7C:
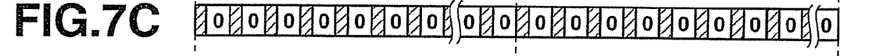
Figure 7D:
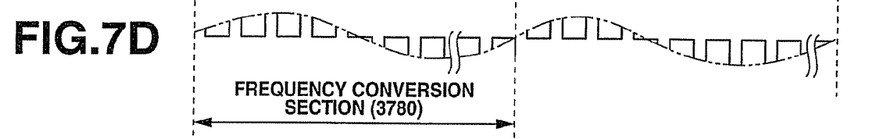

FIG. 7C shows a state in which the received PN sequence is distributingly arranged in a frequency conversion section (with a symbol length of 3780) of the frequency conversion circuit for FB. FIG. 7D shows a waveform after the PN sequence in the state of being distributingly arranged is frequency-converted by also using the frequency conversion circuit for FB, which is a waveform before the frequency conversion when seen after the frequency conversion. The waveform of an envelope indicated by a two-dot chain line in FIG. 7D does not have the breakpoints e, g and h (especially the breakpoint g between frames and between cycles shown in FIG. 7B) appearing in the form of FIG. 7B and shows a smooth waveform.

Figure 8:
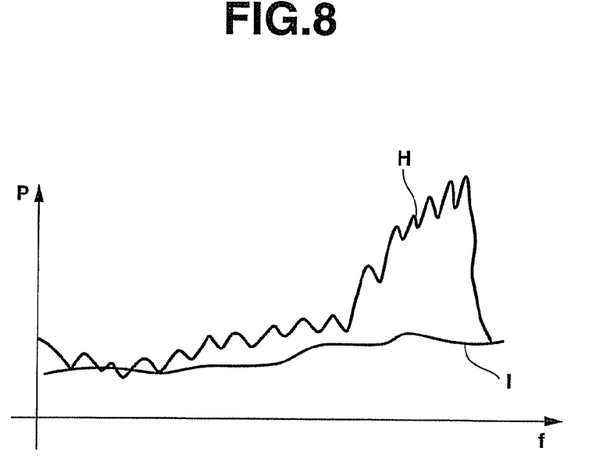
FIG. 8 is a diagram illustrating a frequency characteristic H in the case of frequency-converting a received PN sequence without distributingly arranging the received PN sequence and a frequency characteristic I in the case of frequency-converting the received PN sequence in a distributing arrangement state.

FIG. 8 shows a frequency characteristic H after frequency conversion in the case where the frequency conversion has been performed without performing distributing arrangement (FIGS. 7A and 7B), and a frequency characteristic I after frequency conversion in the case where the frequency conversion has been performed in a distributing arrangement state (FIGS. 7C and 7D). The horizontal axis indicates a frequency f, and the vertical axis indicates power P. When a breakpoint exists in the waveform before frequency conversion when the waveform is seen after the frequency conversion in the case where the received PN sequence x is not distributingly arranged (see FIG. 7B), an unnecessary high-frequency component which does not exist in the original signal occurs after the frequency conversion (reference numeral H in FIG. 8). On the contrary, that the waveform before frequency conversion when seen after the frequency conversion does not have a breakpoint and is smooth as shown in 7D means that the unnecessary high-frequency component is reduced in the waveform after the frequency conversion (reference numeral I in FIG. 8).

Figure 9A:
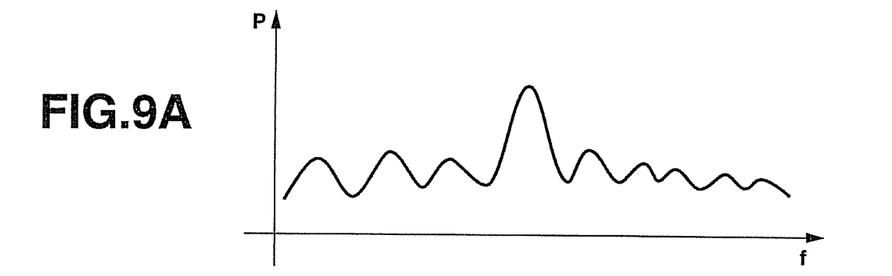
FIGS. 9A and 9B are diagrams illustrating an example of a frequency characteristic of a received PN sequence after delay detection (before correlation operation) and a frequency characteristic of a reference signal after delay detection (before correlation operation)
Figure 9B:
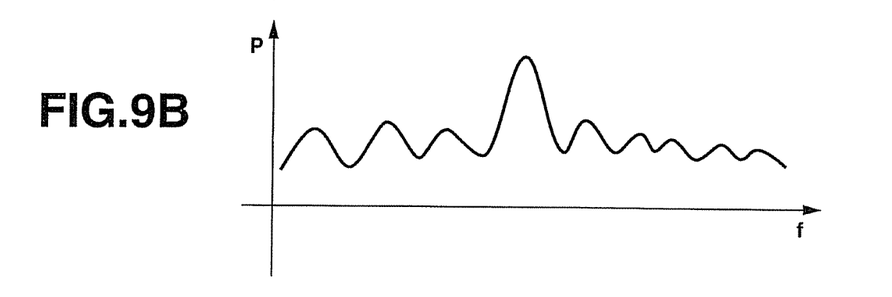

FIG. 9A shows a frequency characteristic after delay detection (that is, before correlation operation) of a received PN sequence, and FIG. 9B shows a frequency characteristic after delay detection (that is, before correlation operation) of a reference signal.

Figure 10:
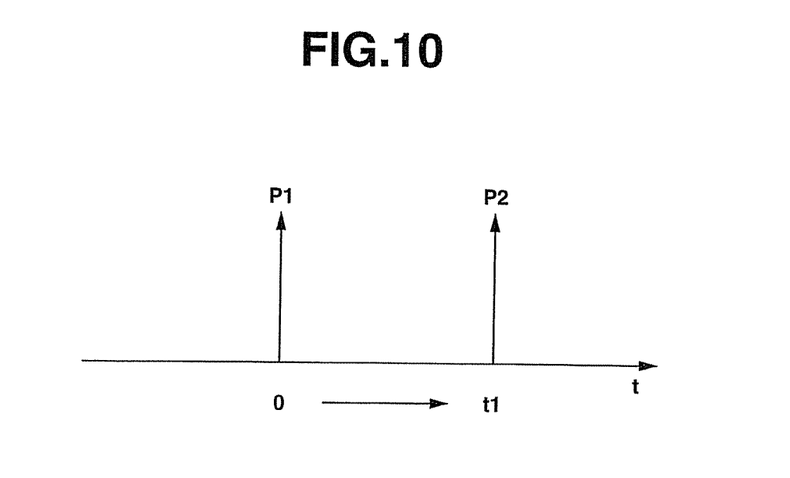
FIG. 10 is a diagram illustrating a method for calculating a frequency error from a temporal deviation.

If there is not a frequency error between the frequency characteristic of the received PN sequence (FIG. 9A) and the frequency characteristic of the reference signal (FIG. 9B) after the delay detection, a peak P1 stands at time 0 on the time axis shown in FIG. 10 when the correlation operation (product sum operation) as shown in FIG. 5 is performed. In the state in which the received signal Sc has a frequency error relative to the reference signal Sr as shown in FIG. 5, in comparison with the state where the frequency characteristics are quite the same as in FIGS. 9A and 9B, the received PN sequence Sc is shifted sample by sample (an amount of shift t1 is required until a maximum peak). When a peak P2 is obtained, the amount of shift t1 from the position 0 is measured as sample deviation as shown in FIG. 10, and a frequency error can be calculated on the basis the sample deviation.

Since distributing arrangement is performed in a frequency conversion section of one predetermined kind of frequency conversion circuit for different FH lengths (or PN sequence lengths) for the three kinds of broadcast mode, it is possible to perform processing by the one frequency conversion circuit.

According to the first embodiment, since frequency error detection can be performed by one kind of frequency conversion circuit without depending on the length of a known signal, a great circuit scale reduction effect can be obtained.

In this embodiment, for example, a frequency conversion circuit for FB with the FB length of 3780 is used to perform frequency conversion of a PN sequence of a predetermined fixed section (for example, a 255-symbol section) shorter than the FB length. Distributing arrangement performed in advance at the time of performing the frequency conversion is performed as a measure for preventing occurrence of a breakpoint by extracting a certain determined fixed section x for the varying PN sequence. To supplement the description, a sequence extracted in the extracted fixed section x differs for each frame when an FH is varying. On the other hand, a reference signal is fixed (for example, the 255-symbol section of fr #0 shown in FIG. 3). As shown in FIG. 2B, x is generated by cyclic extension. If frequency conversion can be performed in a manner that continuity can be kept, x after the frequency conversion can be treated as a same signal only by phase-shifting the reference signal after frequency conversion. The distributing arrangement is performed to perform frequency conversion in a manner that the continuity described above is kept. Therefore, it is possible to detect a frequency error even if a frame number is unknown and there is FH variation.

[Second Embodiment]

Figure 11:
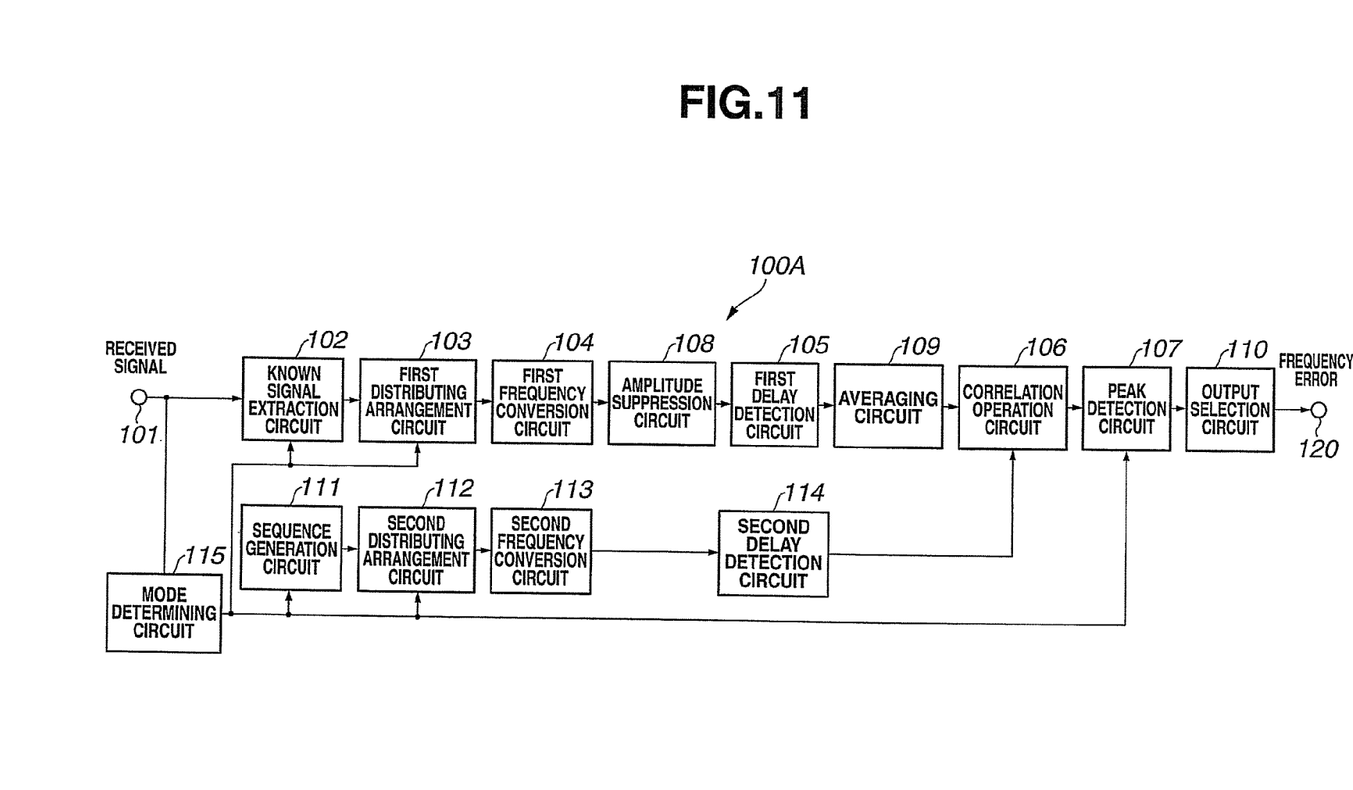
FIG. 11 is a block diagram of a frequency error detection apparatus of a second embodiment of the present invention.

FIG. 11 shows a block diagram of a frequency error detection apparatus of a second embodiment of the present invention.

A frequency error detection apparatus 100A shown in FIG. 11 differs from the configuration of FIG. 1 in that an amplitude suppression circuit 108, an averaging circuit 109 and an output selection circuit 110 are added to the configuration.

The amplitude suppression circuit 108 is provided between the first frequency conversion circuit 104 and the first delay detection circuit 105, and it suppresses an amplitude of a signal in comparison with a threshold calculated on the basis of a frequency-domain signal which is an output of the first frequency conversion circuit 104 and outputs the signal to the first delay detection circuit 105. The amplitude suppression circuit 108 calculates the threshold, for example, from average power of a received PN sequence converted to a frequency-domain signal and suppresses the carrier of instantaneous power exceeding the threshold. As a suppression method, a method of clipping the amplitude with the threshold or a method of causing the amplitude to 0 can be used.

The averaging circuit 109 is provided between the first delay detection circuit 105 and the correlation operation circuit 106. The averaging circuit 109 averages an output of the first delay detection circuit 105 in frames and outputs the output to the correlation operation circuit 106. The averaging circuit 109 averages the output of the first delay detection circuit 105 in frames, for example, for two or more frames and outputs the output.

The output selection circuit 110 selects a frequency error, from among two or more frequency errors detected from received signals at different times from the peak detection circuit 107 and outputs the frequency error. For example, the output selection circuit 110 stores frequency errors calculated for multiple frames and selects a frequency error to be outputted as a final output from among them. As a selection method, a method of selecting a frequency error with the highest frequency from among multiple frequency errors and a method of selecting, at the time of continuously obtaining a same frequency error a specified number of times, the frequency difference are conceivable.

According to the second embodiment, it is possible to eliminate interference waves such as interference due to continuous waves with a single frequency (CW interference) by adding an amplitude suppression circuit. Therefore, it is possible to improve accuracy of frequency error detection.

By adding an averaging circuit, it is possible to eliminate noise, which is a random component, and improve a signal-to-noise ratio included in a correlation value, and therefore, it is possible to enhance the accuracy of frequency error detection.

By adding an output selection circuit, it is possible to select an output appeared to be the most certain, from results detected multiple times, even in the case where the receiving quality of a received signal is poor, and therefore, it is possible to improve the accuracy of frequency error detection.

FIG. 11 shows a configuration in which the apparatus of FIG. 1 is provided with three circuits of the amplitude suppression circuit 108, the averaging circuit 109 and the output selection circuit 110. However, even in the case of a configuration in which the apparatus in FIG. 1 is provided with at least one of the three circuits, the effect of increasing the accuracy of frequency error detection can be obtained.

While certain embodiments have been described, these embodiments have been presented by way of example only, and are not intended to limit the scope of the inventions. Indeed, the novel systems described herein may be embodied in a variety of other forms; furthermore, various omissions, substitutions and changes in the form of the systems described herein may be made without departing from the spirit of the inventions. The accompanying claims and their equivalents are intended to cover such forms or modifications as would fall within the scope and spirit of the inventions.

What is claimed is:

1. A frequency error detection apparatus comprising:
a known signal extraction circuit configured to extract, from a received signal in which a known signal changing periodically is inserted, the known signal;
a first distributing arrangement circuit configured to distributingly arrange the known signal extracted by the known signal extraction circuit, in a fixed section;
a first frequency conversion circuit configured to frequency-convert an output of the first distributing arrangement circuit to a frequency-domain signal;
a first delay detection circuit configured to calculate an amount of phase variation between adjacent frequency components by delay-detecting the frequency-domain signal which is the output of the first frequency conversion circuit;
a sequence generation circuit configured to generate the same sequence as the known signal changing periodically;
a second distributing arrangement circuit configured to distributingly arrange the sequence generated by the sequence generation circuit, in a fixed section;
a second frequency conversion circuit configured to frequency-convert an output of the second distributing arrangement circuit to a frequency-domain signal;
a second delay detection circuit configured to calculate an amount of phase variation between adjacent frequency components by delay-detecting the frequency-domain signal which is the output of the second frequency conversion circuit;
a correlation operation circuit configured to output a correlation value between an output of the first delay detection circuit and an output of the second delay detection circuit; and
a peak detection circuit configured to detect one or more high power peaks among the correlation values, calculate a difference from a reference value and output the difference as a frequency error.

2. The frequency error detection apparatus according to claim 1, further comprising at least one circuit among:
an amplitude suppression circuit provided between the first frequency conversion circuit and the first delay detection circuit and configured to suppress amplitude of a signal by comparison with a threshold calculated on the basis of the frequency-domain signal which is the output of the first frequency conversion circuit and output the signal to the first delay detection circuit;

an averaging circuit provided between the first delay detection circuit and the correlation operation circuit and configured to average the output of the first delay detection circuit for each frame and output the output to the correlation operation circuit; and an output selection circuit configured to select a frequency error from among two or more of the frequency errors detected from the received signals at different times from the peak detection circuit, and output the frequency error.

3. The frequency error detection apparatus according to claim 1, wherein the first distributing arrangement circuit and the second distributing arrangement circuit perform interpolation for a section between distributingly arranged known signals with a fixed value, perform interpolation with a random sequence, or perform interpolation by duplicating the known signal extracted by the known signal extraction circuit.

4. The frequency error detection apparatus according to claim 2, wherein the amplitude suppression circuit suppresses the amplitude of the signal by clipping the amplitude or causing the amplitude to be 0, as a result of the comparison with the threshold.

5. The frequency error detection apparatus according to claim 2, wherein the output selection circuit outputs the frequency error with the highest frequency among two or more of the frequency errors or outputs the same frequency error continuously detected a specified number of times or more.

6. The frequency error detection apparatus according to claim 1, wherein the first frequency conversion circuit is also used as a frequency conversion circuit for data which is for frequency-converting a data signal included in the received signal; and the fixed section is a frequency conversion section of the frequency conversion circuit for data.

7. The frequency error detection apparatus according to claim 1, further comprising a mode determining circuit configured to determine one mode among multiple broadcast modes; wherein frequency error detection of a received signal is performed according to a determined broadcast mode.

\* \* \* \* \*